Figures 1, 2:
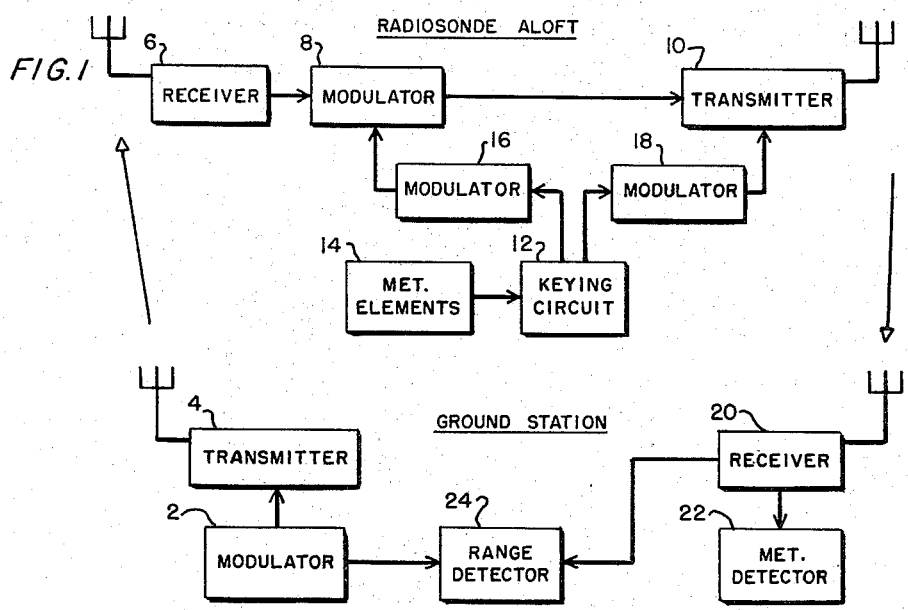

Oct. 27, 1959 — W. TODD — 2,910,683

RADIO TRANSMISSION SYSTEM

Filed Jan. 24, 1957 — 2 Sheets-Sheet 1

INVENTOR.
WILLIAM TODD.

BY
Harry M. Saragovitz
ATTORNEY.

Oct. 27, 1959  W. TODD  2,910,683
RADIO TRANSMISSION SYSTEM
Filed Jan. 24, 1957  2 Sheets-Sheet 2
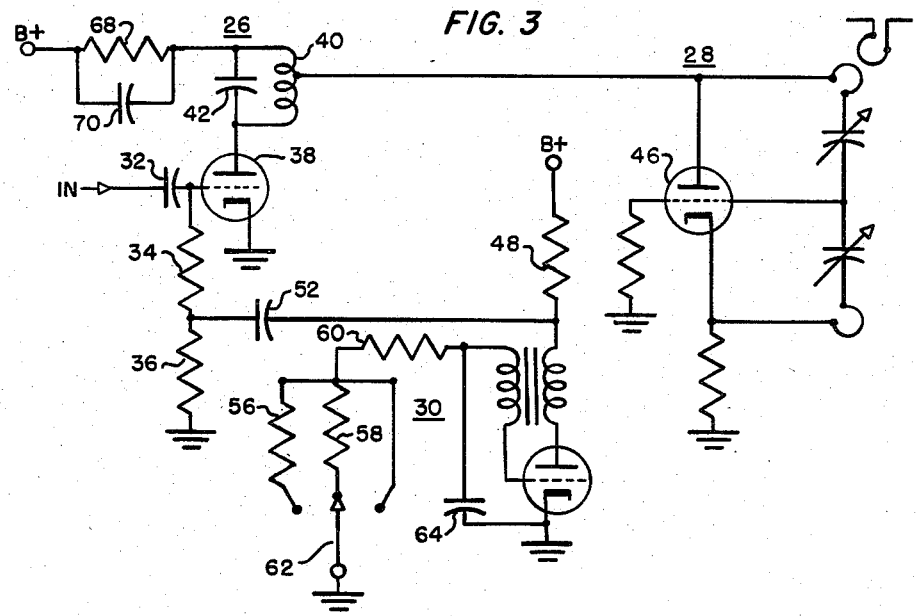
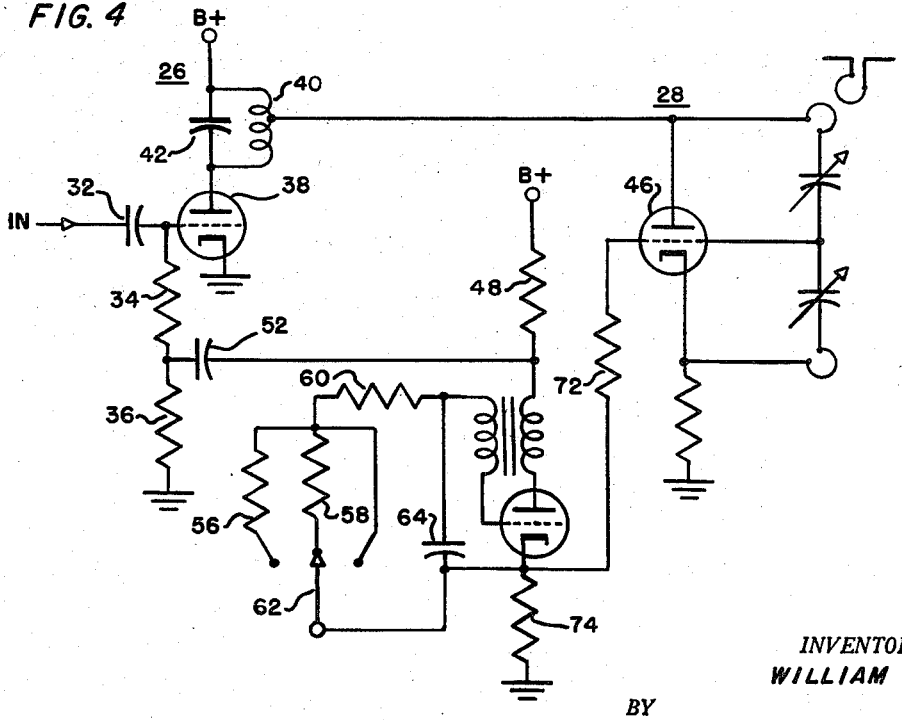
INVENTOR,
WILLIAM TODD.
BY
*Harry M. Saragovitz*
ATTORNEY.

United States Patent Office 2,910,683
Patented Oct. 27, 1959

2,910,683

RADIO TRANSMISSION SYSTEM

William Todd, Interlaken, N.J.

Application January 24, 1957, Serial No. 636,217

9 Claims. (Cl. 340—345)

(Granted under Title 35, U.S. Code (1952), sec. 266)

The invention described herein may be manufactured and used by or for the Government for governmental purposes, without the payment of any royalty thereon.

The present invention relates to radio transmission systems and particularly to a radio transmission modulation system adapted for meteorological radiosonde application.

It is common practice today to obtain information pertaining to upper atmosphere conditions through the use of a balloon borne radio station called a radiosonde, which transmits data on temperature, pressure, and humidity to a ground receiving station. Supplemental to this, the course of the radiosonde is tracked in order to determine wind direction and velocity. This tracking is generally accomplished through the use of optical or radio direction finding means.

Experience with the foregoing system has indicated severe limitations on both the operating limits and accuracy of wind data obtained by it. Further, the system when combined with the economical and new standard scheme of sequentially switching the different meteorological sensing elements does not readily adapt to the automatic processing of data. This is principally due to the difficulty in commutating the temperature and humidity information into the proper computer channels since the rate of switching is a function of the pressure instrument (baroswitch) and the rate of ascent of the radiosonde. If the distance to the radiosonde and elevation angle could be accurately and constantly monitored by radio tracking methods, the pressure instrument could be eliminated, since then both height and pressure can be computed from the other available data. To monitor distance, or range, it has been suggested that the present radiosonde system be modified to include the transmission from the ground station to the radiosonde of a signal which would be retransmitted by the radiosonde back to the ground station, where range could be computed by the technique of time comparison of the transmitted and received signals.

Of several approaches proposed for the design of such a system, which insofar as the radiosonde instrument is concerned must meet the test that it be light, accurate, and yet inexpensive, the one which appeared most suitable is illustrated by the experimental radiosonde system set forth in the following description: A 400 mc. carrier amplitude modulated by a 82 kc. sine wave is transmitted from a ground station; this modulated carrier is received by the radiosonde and the 82 kc. modulation detected and used to frequency modulate a 1680 mc. radiosonde transmitter. This transmitter is also keyed to transmit a time based sequence of temperature, humidity, and reference signals, said keying being at a rate determined by the magnitude of these quantities and in the form of constant width gaps in the transmitted energy. The signal from the radiosonde transmitter is received at the ground station and demodulated, the phase of the recovered 82 kc. component being compared with the phase of the original 82 kc. wave to determine range, and the repetition rate of the keying pulses being detected to indicate temperature and humidity.

While the foregoing system did perform with a measure of success, the range accuracy was not found generally within acceptable tolerances. The present invention has been prompted by the discovery of the cause of this difficulty which thus far has prevented the successful employment of the above described system. The applicant has found that the range inaccuracy was caused by a brief transient off-frequency condition of the radiosonde transmitter occurring as the transmitter turned on at the end of each meteorological modulation.

Accordingly, it is an object of the present invention to reduce or eliminate any interaction or interference between the range and meteorological modulation signals.

It is a further object of the invention to provide a modulation system which in meeting the foregoing requirement does not materially increase the complexity, circuitry, weight, or cost of the radiosonde.

In accordance with the invention the range signal output from the radiosonde receiver is keyed, that is the range signal is interrupted during meteorological pulses. Between interruptions the range signal is applied to modulate the radiosonde transmitter carrier. In addition, simultaneously with the pulse interruptions of the modulating signal, the transmitter carrier frequency is shifted. This system thus eliminates the previously noted off-frequency condition during the period when the range signal is "on," to insure accurate range detection, and introduces a frequency shift when the range sigal is "off" to more accurately and effectively transmit the meteorological intelligence.

While it would appear that pulse interruption of the range signal alone might be sufficient meteorological data modulation, the inventor found that with this mode of operation detection of the pulses at the ground station was often erratic, particularly at the longer ranges. He determined that this was due to the difficulty of the detector in discriminating between signal and noise energy, and discovered that by both cutting pulse "holes" in the range signal and shifting the transmitter carrier frequency during the "hole" period, that the difficulty could be overcome.

The features of the invention which are believed to be novel are set forth with particularity in the appended claims. The invention itself, however, both as to its organization and method of operation, together with further objects and advantages thereof, may best be understood by reference to the following description taken in conjunction with the accompanying drawing in which:

Figure 1 is a block diagram of an embodiment of a radiosonde system employing the invention; and Figures 2, 3, and 4 are schematic circuit diagrams illustrating three embodiments of the invention.

Referring to Figure 1, the radiosonde system shown consists broadly of a ground radio station and a balloon suspended radio station, or radiosonde. At the ground station, modulator 2 generates a range signal which modulates a higher frequency carrier generated and transmitted by transmitter 4. This modulated carrier is received and demodulated at the radiosonde by receiver 6. The recovered range signal is fed to modulator 8, which, in accordance with the range signal, frequency modulates transmitter 10. The keying circuit 12, in accordance with meteorological elements 14, controls modulators 16 and 18 which respectively and simultaneously act to block or interrupt modulation by modulator 8 and to produce a frequency shift in the otherwise unmodulated carrier output of transmitter 10 during keyed periods.

The output of transmitter 10 is received at the ground station by receiver 20 where frequency shift in the carrier, which is frequency shifted at a rate determined by the meteorological data, is detected by meteorological detector 22. Range detector 24 is fed by local modulator 2 a sample of the range signal as originally transmitted, and by receiver 20 a sample of this signal after transmission to and from the radiosonde, and by time or phase comparison, the range detector indicates the range to the radiosonde in a manner well known in the art.

The receiver output which is fed to the meteorological detector 22 passes through a low pass filter to pass only the meteorological signals which vary at repetition rates less than a few hundred cycles. The range signal from the receiver is passed through a bandpass filter designed to pass the range signal which with the system outlined above is 82 kc.

Figure 2 shows a radiosonde modulation system consisting of modulator stage 26, transmitter stage 28, and blocking oscillator stage 30. A ranging signal corresponding to the desired modulation is impressed through capacitor 32 across resistors 34 and 36 between the grid and cathode of modulator tube 38. The modulating output voltage is connected through a tap on impedance matching inductor 40 to the anode of frequency shift oscillator-transmitter tube 46. Frequency shift modulation by varying the anode potential occurs by virtue of resulting variations in inherent frequency sensitive tube operating conditions. While Figure 2 shows anode voltage modulation to accomplish frequency modulation, it will be appreciated that modulation of other electrode voltages will accomplish this result. For example, frequency shift by a shift of oscillator grid potential is described below with reference to Figure 4.

Returning to Figure 2, when blocking oscillator stage 30 switches "on," because of the voltage drop in its anode load circuit, the voltages are lowered on both the grid of modulator tube 38 and the anode of oscillator-transmitter tube 46 causing the modulator tube to cut off and there to occur a frequency shift in the transmitter. The first effect is caused by the drop across resistors 48 and 50 which is applied to the grid of tube 38 through capacitor 52 across grid resistor 36. The second effect is caused by the voltage drop across resistor 50, shunted by bypass capacitor 54, which is common to the anode circuits of both the blocking oscillator and oscillator-transmitter.

The switching rate of the blocking oscillator is determined by a resistance-capacitance circuit which includes switch 62 for inserting in series with a reference resistor 60 either a temperature sensitive resistor 56 or humidity sensitive resistor 58. To establish a reference signal both resistors 56 and 58 may be bypassed by a shorting position on switch 62. Capacitance is provided by capacitor 64 connected across the resistors.

Figure 3 shows a modification of the radiosonde modulation system shown in Figure 2 and it differs in that the load resistor 48 of blocking oscillator 30 is connected to B+ directly, common load resistor 50 and bypass capacitor 54 have been removed, and another common load circuit, comprising load resistor 68 and bypass capacitor 70 has been connected between impedance matching inductor 40 and B+. The operation of the circuit in Figure 3 differs from that of the circuit in Figure 2 in that when the blocking oscillator 30 keys "on" and modulator tube 38 cuts off, the anode voltage on oscillator-transmitter tube 46 rises due to the decrease in voltage drop across resistor 68 causing a shift in frequency and an increase in the transmitter output level.

Figure 4 shows still another embodiment of the invention and it differs from Figure 3 in that common load resistor 68 and bypass capacitor 70 have been removed; the cathode of the blocking oscillator tube, the ground connection of switch 62, and the ground connection of grid resistor 72 of oscillator-transmitter tube 46 have been raised above ground by a common resistor 74. The operation of the circuit in Figure 4 differs from that of Figures 2 and 3 in that a shift in transmitter output frequency occurs during blocking oscillator "on" periods by virtue of the rise in grid voltage on oscillator-transmitter tube 46 caused by the increased voltage across resistor 74. If desired the modulating voltages from modulator 26 may also be applied to the grid of tube 46, instead of to the anode as shown.

Operating at a mean carrier frequency of 1680 mc., a typical frequency shift and frequency modulation deviation for the circuitry set forth in Figures 2, 3, and 4 employed in a radiosonde application has been found to be on the order of 200 kc.

While there have been described what are at present considered preferred embodiments of the invention, it will be obvious to those skilled in the art that various changes and modifications may be made therein without departing from the invention; and it is aimed in the appended claims to cover all such changes and modifications as fall within the true spirit and scope of the invention.

What is claimed is:

1. A radio transmission system comprising a modulator, a radio frequency carrier oscillator, said modulator being connected to said oscillator to produce frequency modulation of the oscillator, and keying means connected to said modulator and said oscillator to simultaneously interrupt said frequency modulation and shift the oscillator carrier to a different frequency.

2. A system as set forth in claim 1, wherein the said oscillator includes means responsive to a change in applied potential for changing the frequency of oscillation, said modulator includes means responsive to a change in applied potential for interrupting the modulator output, and said keying means includes means for intermittently changing said applied potentials.

3. A modulation system comprising a keying stage, a modulator stage, and a radio frequency carrier oscillator stage, said modulator stage being connected to modulate said oscillator stage, each of said stages including an electron tube comprising a cathode, grid, and anode, said keying stage electron tube being connected as an electronic switch having two differing anode-cathode current states, a load impedance between two of the electrodes of said oscillator tube being common to the anode-cathode circuit of one of the other tubes, and an impedance in the anode-cathode circuit of said electronic switch being connected across the grid-cathode circuit of the modulator tube to cut off the anode-cathode circuit of said modulator tube during keyed periods.

4. The modulation system set forth in claim 3, wherein a portion of the output modulation voltage of said modulator stage is applied across the anode-cathode circuit of said oscillator to produce said modulation.

5. The modulation system set forth in claim 3, wherein said common load impedance is common to the anode circuits of said electronic switch and said oscillator tube, and said impedance in the anode-cathode circuit of said electronic switch is capacitively coupled across a portion of the grid-cathode circuit of said modulator tube.

6. The modulation system set forth in claim 3, wherein said common load impedance is common to the anode circuits of said modulator tube and said oscillator tube, and said impedance in the anode-cathode circuit of said electronic switch is capacitively coupled across a portion of the grid-cathode circuit of said modulator tube.

7. The modulation system set forth in claim 3, wherein said common load impedance is common to the grid-cathode circuit of said oscillator tube and the cathode circuit of said electronic switch, and said impedance in the anode-cathode circuit of said electronic switch is capacitively coupled across a portion of the grid-cathode circuit of said modulator tube.

8. In a radiosonde system in which a range determining radio signal is transmitted from a ground station to a radiosonde station aloft and said signal is retransmitted to the ground together with a signal representing meteorological data observed by the radiosonde, an improved modulation system for said radiosonde station comprising: a modulator which receives and is adapted to respond to said ground radio signal, a radio frequency-shift oscillator-transmitter, a keying means, and meteorological sensitive resistance elements, said modulator being connected to said oscillator-transmitter to produce a frequency modulation of the oscillator-transmitter in accordance with said ground radio signal, said keying means being connected to said modulator and said oscillator-transmitter and during keyed periods the keying means interrupts said response of said modulator to said ground signal and switches the unmodulated carrier frequency of said oscillator-transmitter to a different carrier frequency, and said keying means including means connected to said resistance elements for varying the rate of keying in response to the prevailing resistance of one of said elements.

9. A radio transmission system comprising a frequency modulator, a radio frequency-shift oscillator, said modulator being connected to said oscillator to produce frequency modulation of the oscillator, a keying switch being so connected to said modulator and said frequency shift oscillator to simultaneously interrupt said frequency modulation and shift the frequency of said oscillator.

References Cited in the file of this patent

UNITED STATES PATENTS

| | | |
|---|---|---|
| 2,198,113 | Holmes | Apr. 23, 1940 |
| 2,248,727 | Strobel | July 8, 1941 |
| 2,451,347 | McShan | Oct. 12, 1948 |
| 2,456,992 | Pugsley | Dec. 21, 1948 |
| 2,583,484 | Guanella | Jan. 22, 1952 |
| 2,613,347 | Todd | Oct. 7, 1952 |